Aug. 19, 1969  G. R. MORRIS  3,462,038

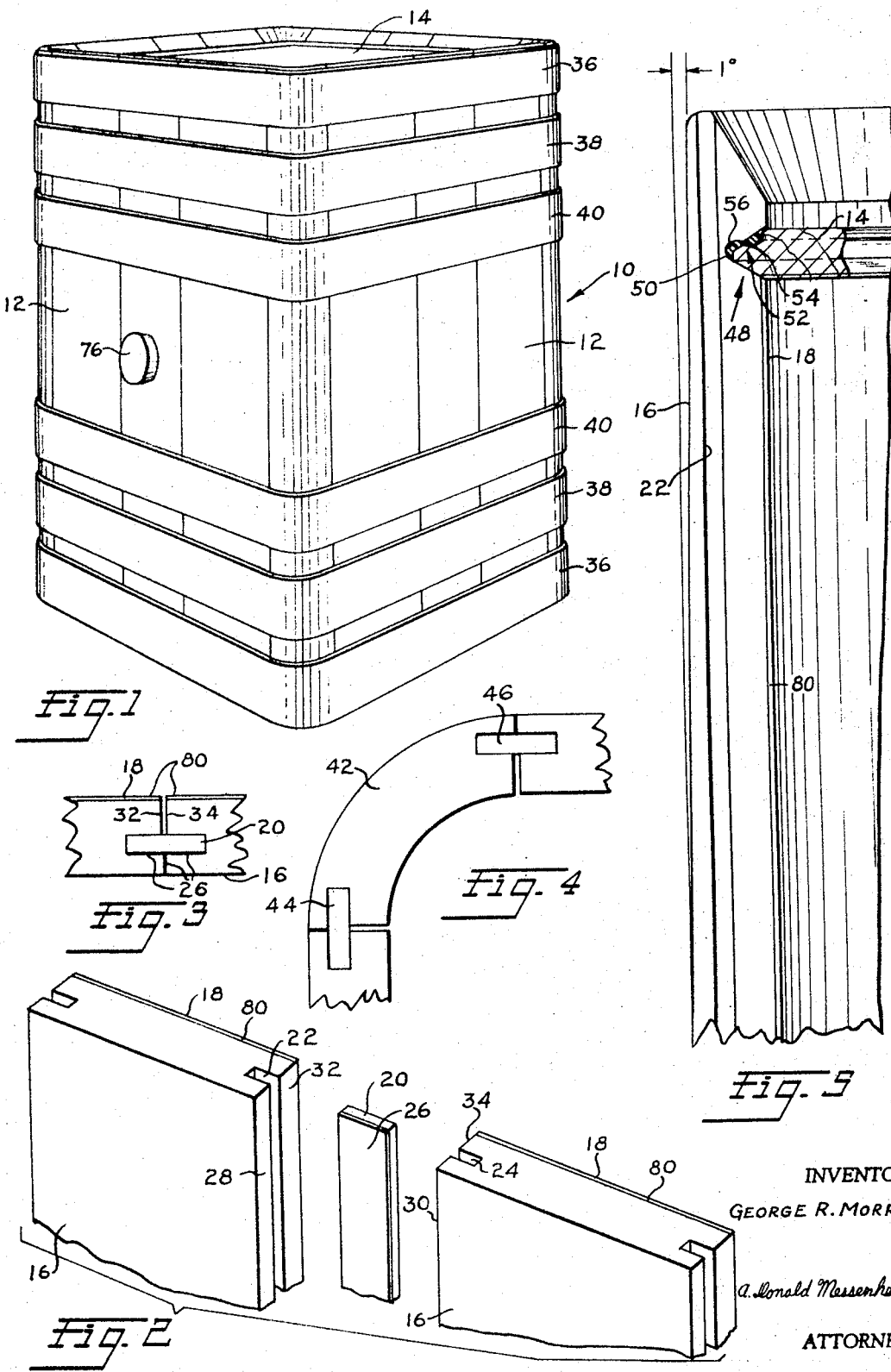

SQUARE BARREL-LIKE CONTAINER

Filed May 25, 1967  3 Sheets-Sheet 2

INVENTOR
GEORGE R. MORRIS

BY A. Donald Messenheimer
ATTORNEY

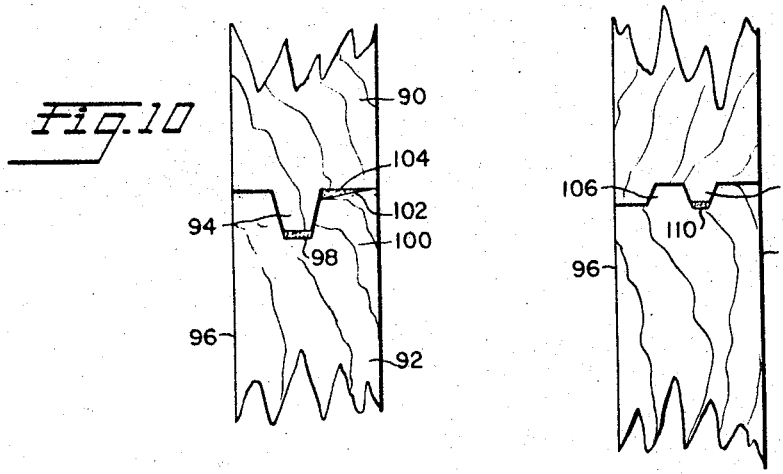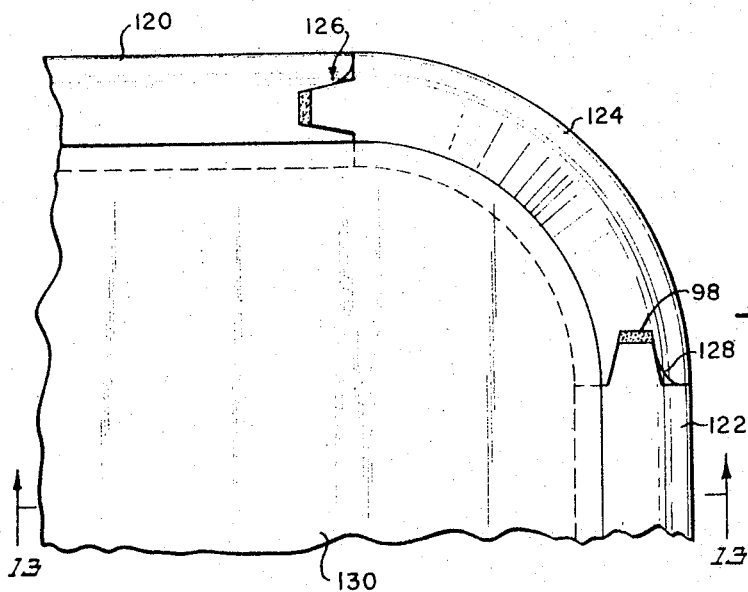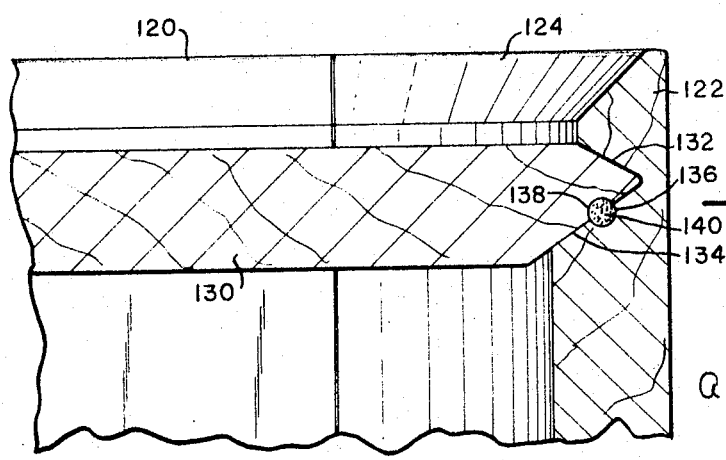

United States Patent Office 3,462,038
Patented Aug. 19, 1969

3,462,038
SQUARE BARREL-LIKE CONTAINER
George Richard Morris, Long Lane, Mo., assignor of fifteen percent to Alva Donald Messenheimer, Bethesda, Md.
Continuation-in-part of application Ser. No. 553,385, May 27, 1966. This application May 25, 1967, Ser. No. 641,330
Int. Cl. B65d 9/32
U.S. Cl. 217—72                     21 Claims

ABSTRACT OF THE DISCLOSURE

A barrel-like container made of quarter-sawn staves having a thickness of between ¾ and ⅝ of an inch wherein the body staves have a straight longitudinal axis and the container has no bilge. The adjacent body staves and the heads are secured together by an elastomeric bonding agent. By these techniques it is possible to construct a "square barrel-like container" that is adapted for aging whiskey.

---

This application is a continuation-in-part of application Ser. No. 553,385, filed May 27, 1966, now abandoned.

This invention relates to barrel-like containers that are made of timber staves cut from stave bolts in a manner like that which has been characteristic of the wooden barrel industry, but using novel techniques that make it possible to provide a barrel-like container that may be round, square or have any desired polygonal shape.

There has been a long-standing need in the whiskey distilling industry for a square barrel-like container because the conventional round barrel customarily used requires a large storage space volume compared with the volume of its contents. A square barrel-like container will provide a space savings of over 40%. To my knowledge all prior efforts at making square barrels for distilling whiskey have been unsuccessful in part because of the stringent requirements imposed by the distilling industry.

In the art of distilling whiskey, barrels having a volume of approximately 50 gallons are made of staves that are quarter-sawn from stave bolts of white oak. Customarily body stave bolts are 39 inches long and head stave bolts are 26 inches long. Depending on the size of the tree, from 20 to 40 staves that have been cut on a barrel saw to provide the double arch shape and thoroughly dried, are assembled to form the body of a barrel by a process which involves a large number of operations using primarily manual labor. Flat head staves having two planar surfaces are secured in a croze and steel hoops of differing diameters are placed over the heads of the barrel and driven toward the center to compress the body staves together and against the head staves.

By careful selection of staves, it has been possible to make what is classified as a "tight" barrel, i.e., one which does not leak when partially filled with water and air under a pressure of up to about 5 p.s.i.g. is applied. However, such barrels are quite expensive to fabricate, and from time to time develop leaks which must be stopped by driving the steel hoops toward the center of the barrel. Since butt joints are used, the loss at joints which are merely wet but don't drip is believed to amount to 10% or more during the period required for aging of whiskey.

Barrels have in the past been used with a bag liner with a coating of various materials such as glue, paraffin, silicate of soda, asphaltum and the like. The primary function of the lining is to protect the contents of a barrel from contamination and leakage. However, linings cannot be used for distilling whiskey where the inside surface must be charred; use is also prohibited with other food products where the liner may cause contamination.

In the distilling of bourbon whiskey, the selection of materials and construction used have been found to be very critical. Normally, white oak, preferably grown in certain types of soils, is considered to have desirable characteristics to age bourbon whiskey. The whiskey penetrates not over about one-half inch into the wood and certain undesirable ingredients are filtered through the charred inside surface and removed from the liquid while other substances from the wood enter into the liquid. Prior efforts at aging whiskey in barrels where the staves or side walls of the barrel or other containers were fabricated of laminated white oak have been unsuccessful. Hence the use of containers with liners or containers fabricated out of materials other than white oak timber are unquestionably unsatisfactory for aging whiskey.

It is an object of the present invention to provide a novel barrel-like container that is made of wooden staves, but which has the staves secured together in a rigid manner to provide a "tight" barrel.

A further object is to provide a novel construction for such a barrel-like container so that the side walls may be made of heading (i.e., planar) staves or staves that have a straight longitudinal axis which do not require the arch that forms the bilge in the conventional barrel.

Yet another object is to provide a barrel-like container that may have flat or planar side walls which are secured at their opposite ends to the heads and which are joined at their side edges by a radius stave to thus make possible the construction of a barrel-like container having a polygonal shape with a number of sides. If arcuate staves are used, the barrel of the present invention may be round or oval shaped. By making the height approximately equal to the breadth and depth, all staves may be cut from stave bolts of uniform length.

A still further object resides in providing a novel joint between adjacent staves that may utilize a bonding agent which has sufficient strength to hold the adjacent staves together and which has sufficient elastomeric properties to accommodate the swelling of the wood when the barrel-like container is filled with a liquid. Such bonding agent, when uniformly applied along the entire length of the joint, can be used to provide a "tight" barrel-like container with greatly improved protection against leakage. In the joint preferred for whiskey barrels, it is preferable that the bonding agent be kept out of contact with the whiskey in the barrel as much as possible.

Still another object is to provide a novel joint for sealing the heads to the body staves around the croze. In such joints using a bonding agent, special dimensioning may be provided to accommodate the expansion and contraction of the staves and the difference in the coefficient of expansion as determined by the direction of wood grain. Also, self-aligning splines or fingers may be used to advantage to facilitate assembly making possible major economies in the fabrication of the barrel-like container by reducing manual labor requirements and enabling the increased use of automated equipment.

A yet further object resides in the novel use of a container made of white oak lumber staves having four straight side walls joined by corner staves all secured together by a bonding agent having minimum contact with the charred inner surface for the storage and aging of whiskey.

These and other objects of the invention will become more fully apparent from the claims, and from the description as it proceeds in conjunction with the appended drawings, wherein:

FIGURE 1 is a perspective view of a novel square barrel illustrating the present invention;

FIGURE 2 is an exploded pictorial view to an enlarged scale showing two staves and the spline with an adhesive layer ready for assembly to make a joint;

FIGURE 3 is a top plan view of the assembled joint between staves showing a clearance between part of the edge surfaces to accommodate expansion of the inside portion of the stave resulting from absorption of the liquid contents without over-stressing the joint;

FIGURE 4 is a top plan view illustrating how the corner stave may be used for joining two side walls together;

FIGURE 5 is a partial section in elevation showing the croze cut in the body staves and the upper head with its tapered edge fit into the croze in a generally conventional manner excepting for the novel adhesive reservoirs provided to strengthen and improve the seal;

FIGURES 10 and 11 are views of alternative joints between body staves illustrating a finger and a double-finger type joint which has been found to be satisfactory;

FIGURE 12 is a top plan view of one corner of a further embodiment of a barrel-like container according to the present invention using the finger-type jointed illustrated in FIGURE 10; and FIGURE 13 is an elevation in section of the barrel shown in FIGURE 12.

Figure 6:
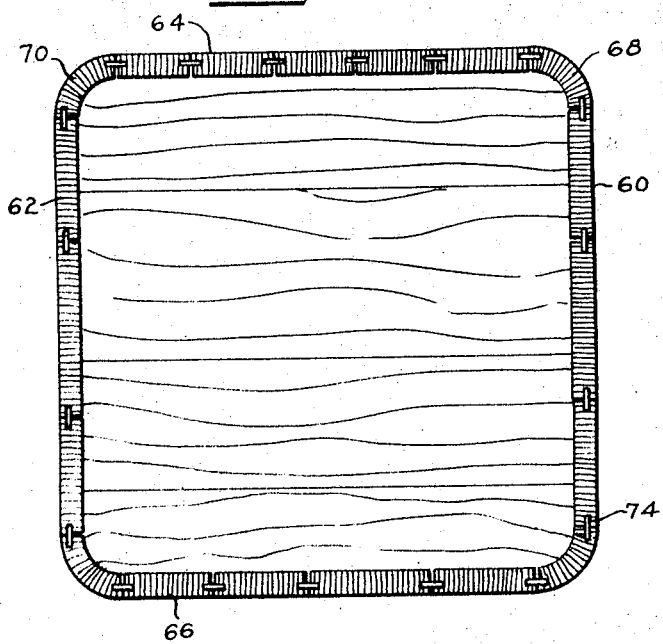
FIGURE 6 is a top plan view of the barrel of FIGURE 1 illustrating the grain direction in the various staves and the orientation of the staves in the heads.

Referring now to FIGURE 1, the barrel 10 of the present invention is illustrated with four side walls 12 that may all be made in a substantially identical manner. Where the barrel-like container is to be used for aging whiskey, it is essential, as is well known in the art, to use quarter-sawn staves with the grain of white oak free from sap that are approximately one inch thick. Customarily, whiskey is aged in barrels having a capacity of about 50 gallons that have stave length of about 36 inches and a head diameter of about 23 inches. A barrel-like container as illustrated in FIGURE 1 which has a 20 inch square head and a stave length of 30 inches will have roughly the same storage capacity, but a cargo displacement volume reduction of over 40%.

Since the staves must be quarter-sawn, there is a practical maximum width limitation imposed by the diameter of the tree. Hence stave widths do not customarily exceed six inches. For the prior art round barrel, the staves are cut on a barrel saw to provide two arches in perpendicular directions. For the square barrel as illustrated in the drawings, the staves can be cut to have parallel faces 14 and 18 as illustrated in FIGURE 2, or to have an arch shape in only one direction as is apparent from FIGURE 3. However, to prevent cupping, it is desirable that the stave width not be in excess of about 5 inches.

In the prior art round barrel, the joint between two staves has, in practice, been a butt-joint. Because of the complex operation of assembling and fitting together 30 or more staves by use of a metal ring and subjecting the wood to steam and other treatments that are necessary to align the staves individually, it has been very expensive to use tongued-and-grooved body staves to make a smooth joint. Also, coopers have learned in the 2000 years of making round barrels how to make a barrel sufficiently tight so that liquid does not drip from between staves; where leaks appear after the barrel is filled, the leak can normally be stopped by tightening one or more of the hoops. While small water casks and kegs, having a capacity less than 30 gallons, have been made with an oval shape by using variable radius staves, the foregoing characteristics of the prior art barrel have precluded any possibility of making a barrel square.

A characteristic feature of the barrel-like container of the present invention is that instead of a butt joint, the staves are held together with a layer of a bonding agent. Butt joints do not provide a sufficient area for the adhesive layer to have the strength necessary to support the joints at the centers of the straight walls. Also, whiskey is an excellent solvent and hence will dissolve many adhesive materials sufficiently to weaken the joints. Therefore, in accord with one feature of this invention, the joint between two body staves has been devised in such a way as to increase the area of the layer of adhesive and to also decrease the likelihood of contact between the whiskey in the barrel-like container and the adhesive layer.

One such joint, using a spline having a rectangular cross section, is illustrated in FIGURES 2 and 3. This joint and those shown in FIGURES 7-11 can all be made sufficiently strong so that, under testing, failure occurs in the stave rather than in the joint. Since the hoops in a square barrel-like container cannot support the center staves on a side wall, it is essential that the joint be constructed in such fashion as to withstand the loading that occurs.

But merely making the joint between two body staves as strong as the wood itself does not solve all of the problems presented in a barrel-like container of this type. When the barrel-like container is filled with a liquid, the inner surface swells, as compared with the outer dry surface. This then causes a force to arise tending to pull the center portion of each side wall away from the heads. Thus, construction of this type of container requires a means to prevent the separation of the side wall from the head, and the magnitude of this problem becomes more severe as the dimensions of the sides of the barrel-like container increase. One solution is to provide a round metal hoop with a segment of a non-compressible member such as wood that has a flat side held against the side wall of the square barrel-like container by the tension exerted by the hoop. However, an obvious disadvantage is that this construction defeats the saving of space resulting from the square configuration. Hence, it is preferred to provide joint constructions which can withstand the forces involved.

Referring now to FIGURE 2 illustrating a spline-type joint, it has been found that spline 20 may have a length equal to the length of the stave, though a spline length merely sufficient to extend into slots in that portion of the body staves between the upper and lower heads 14 may be equally satisfactory. The size of the spline, and hence of the slots, should be selected to give added strength. A spline width of one inch, as measured in the direction of the width of the staves, has been found to be satisfactory. The thickness of the spline may be about one-quarter inch. The dimensions of each slots 22 and 24 may be, therefore, about one-half inch deep and one-quarter inch wide.

To secure spline 20 into slots 22 and 24, a layer 26 of a suitable elastomeric bonding agent is applied on the outer surface of spline 20. When spline 20 is inserted into slot 22, a continuous layer of bonding agent is provided which, when set, may provide a joint of substantial strength. The stave containing slot 24 is next inserted over the other half of spline 20 thereby spreading excess bonding agent to completely cover surfaces 28 and 30, but none along surfaces 32 and 34, unless the bonding agent is inert to the contents to be placed in the barrel. After all the stave forming one side of the barrel-like container are assembled, they may be placed in a press and the bonding agent allowed to set. Depending on the composition of the bonding agent, the curing may be accelerated by heat and pressure, by radiation such as to cause polymerization, or by a catalyst.

A number of epoxy resins are commercially available that have suitable properties from the strength standpoint for use as the bonding agent. A specific two component, non-toxic, epoxy adhesive that has been found to be satisfactory has the following properties:

| | |
|---|---|
| Compressive yield point, ASTM D695–52T _____ p.s.i._ | 12000 |
| Tensile ultimate, ASTM D638–52T _____ | 5700 |
| Percent elongation, ASTM D638–52T _____ | 9.3 |
| Flexural modulus, ASTM D740–49T _____ | $2.3 \times 10^5$ |
| Flexural ultimate _____ | 9300 |

Other adhesive or sealant materials that may be used as the bonding agent include polymerized esters, vinyls, styrenes, acrylics, silicones, ethylenes and propylenes. Basically, these materials are characterized by forming three-dimensional molecular bonds during the curing or polymerizing step. Materials such as methyl methacrylate may be applied as a monomer in liquid form to penetrate into the wood fibers and thereafter be polymerized by gamma radiation. A polymerizable compound highly resistant to solvents is a terephthalic acid and ethylene glycol.

Some materials are toxic and the selection of a preferred adhesive may therefore depend on a number of factors, including flexural and elongation characteristics. For larger-sized barrel-like containers, the elongation properties become more critical. For barrels having capacities of 50 gallons or more, a single component, synthetic, rubber sealant similar to that used with boats has been found preferable because of its superior elongation properties.

Slots 22 and 24 are not necessarily located in the center of the edge wall of the stave, but instead may be located closer to the outer stave surface 16. During the aging of whiskey, it is common knowledge that the whiskey penetrates about one-half inch into the thickness of the stave. It is desirable to avoid having any foreign substance in the barrel-like container which might deleteriously affect the aging process. Hence, in barrel-like containers for aging-whiskey, the walls of slots 22 and 24 may be located about one-half inch from the inside charred surface 18 and one-quarter inch from the outside surface 16 of the stave. The center line of the slot is thus more than one-half inch from the charred surface 18 of the stave. As the adhesive layer 26 may be applied on only the outer surface of spline 20, such arrangement will be effective to locate the adhesive in a position where it will not normally contact the contents in the barrel-like container. Even though an adhesive when cured is chemically inert, it is nonetheless thought desirable to prevent it from contacting whiskey during the several years of storage in the barrel; hence the spline can serve as a barrier to prevent the adhesive from being closer than one-half inch to the charred inner surface and also a large surface area for the adhesive so that a joint of adequate strength can be achieved.

Because only the inside half of the stave becomes wet during the distilling process, a greater expansion due to swelling occurs at the charred inside surface 18 of the stave than on the outside surface 16. Also, relevant to this problem is the construction of the head and its seal to the staves which will be discussed below. However, as shown in FIGURES 2 and 3, it may be desirable to cut the edges of the staves so that when dry, surfaces 32 and 34 have a slight spacing that becomes a sealed butt joint when the barrel is filled with a liquid due to the swelling caused by the wetting of the inside charred surface 18 which causes cupping toward the outside dry surface. Cupping may be effectively eliminated by using narrow staves, that is those not wider than about 5 inches. Such a technique aids in maintaining a substantially constant gross dimension for the barrel and may obviate the necessity for some or all of the hoops 36, 38 and 40, particularly in small barrel-like containers or kegs.

Referring now to FIGURE 4, a corner may be formed to have any desired radius. Thus, a stave cut on a conventional barrel saw or formed on other wood-working equipment, may be used. If a hollow tube is provided, it can be cut along the zero and 90° lines to provide four corner staves 42 of equal size. These staves may be grooved and joined to the straight staves as by splines 44 and 46 in the same type of joint as described above. Also, the stave for each corner may be formed as two or more staves if desired to reduce alignment or expansion problems.

The heads 14 at the ends (top and bottom) of the barrel-like container may be formed of staves that are joined together in any suitable manner. As the loading on the heads is somewhat less severe in view of the conventional manner that the head is mounted in the barrel, other techniques less costly than the spline assembly shown in FIGURES 2 and 3 may be satisfactory for joining the head staves in a leak-proof joint. However, by using the spline joint as described above, the head staves can easily be joined to form the head.

The body staves may be grooved to form the conventional croze 48 as generally shown in FIGURE 5 and the heads fitted to the croze. For a round barrel using the adhesive joint of the present invention, the body staves which would be curved can be assembled into two sub-assemblies, the heads placed in one sub-assembly, the other sub-assembly placed in position and the final assembly completed upon placing the hoops in position. The heads may thus be assembled with or without the use of adhesive or a bonding agent. If the final assembly is without adhesive, the barrel may be taken apart by merely removing the hoops and thereafter reassembled, as desired.

If a polygonally shaped barrel-like container, such as a square barrel-like container, is desired, the head hoop 36 cannot be relied upon to make a tight joint that will not leak. For such non-circular barrels, an enlargement 50 at the bottom of the croze may be desirable. Also, there is advantage in leaving the full thickness of the stave above the head rather than cutting away part of the stave, as is customary in the conventional round barrel to form the chime. Heads 14 may be tapered in the conventional manner as illustrated in FIGURE 5, and the tapered edge 52 fit into croze 48. A small groove 54 may be provided in the upper tapered surface for increasing the amount of bonding agent that can be held along the upper surface of tapered edge 52. A body of bonding agent 56 is placed in enlargement 50 and along the upper surface of the taper on the edge of head 14. This arrangement makes it possible to avoid having the bonding agent along the lower surface of the taper on the edge of head 14 or within about one-half inch of the charred inner surface of the barrel, and yet provides a leak-tight joint of sufficient strength.

Referring now to FIGURE 6, a top plan view of the barrel-like container of FIGURE 1 is shown with the wood grain lines illustrated.

The grain in the head staves, four being illustrated, will be parallel to each other and to the grain in the body staves on two sides 60 and 62, but will be perpendicular to the grain in the body staves on the other two sides 64 and 66. Hence, the expansion due to moisture absorption at the croze of FIGURE 5 by the heads and sides 60 and 62, may be about equal assuming both are exposed to liquid and the joints between the body staves and head staves are comparable. But the gross expansion of the head staves in the direction of the grain will be less than the expansion of the abutting body staves on sides 64 and 66 unless special precautions are taken. Thus, it will be advantageous to take steps to reduce the gross expansion of the body staves. One such step is to provide a spacing between edges 32 and 34 of adjacent body staves, as described in connection with FIGURE 3. The flexural properties of the bonding agent are important and for this joint a different bonding agent may be required than may be desired for the joints between the body staves or between the head staves. However, with head hoops 36 and the flag normally used to caulk heading joints at the chime, the leakage at this joint can be substantially eliminated.

For assembly of the square barrel, side walls 60 and 62 may first be joined to side wall 64 by corner body staves 68 and 70 to form a first sub-assembly. Thereafter, the upper and lower heads may be placed in position in the croze of this sub-assembly. Side wall 66 with its corner staves may be assembled as a second sub-assembly. In final assembly, the two sub-assemblies may be put together at joints 72 and 74. At each step where the bonding agent is applied, holding means, such as clamps, may be used for the time required for the adhesive to set or cure.

It may be advantageous, and in the larger sized barrel-like containers, essential to have conventional barrel hoops 36, 38 and 40, as illustrated in FIGURE 1. The head hoops 36 will, in particular, play an important role in strengthening the corners, and one or more body hoops may be used depending upon the size of the barrel and handling techniques used.

The hoops may be initially formed to have a shape and size conforming with the exterior dimensions of the barrel-like containers, and the overlapping ends secured together as by conventional welding or riveting techniques. A small taper of about 1° as illustrated in FIGURE 5 may be formed on each end of the barrel, as by sanding, to enable the hoops to be driven or otherwise forced into their desired position.

The bung hole 76, which is illustrated in FIGURE 1 as being in a body stave, may advantageously be located in a head stave near a corner of the barrel to facilitate draining. Because there is no bilge in the body staves, complete drainage may be most easily achieved by a bunghole located in the corner and the barrel-like container placed on a suitable drain rack.

Figure 7:
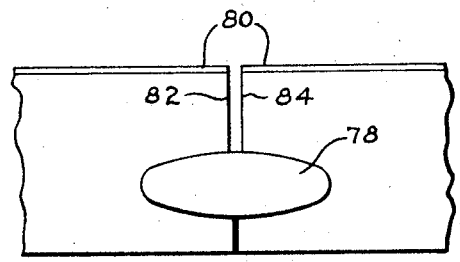
FIGURES 7-9 are views of alternative joints between body staves illustrating various configurations which may be used for the splines.
Figure 8:
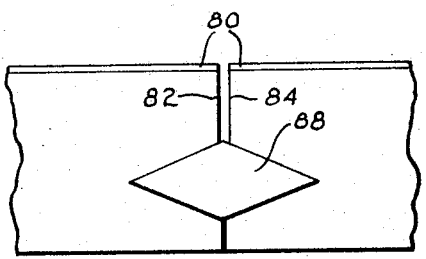
Figure 9:
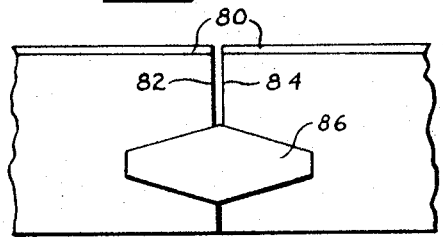

With reference now to FIGURES 7, 8, and 9, modified forms of the joints between adjacent staves are illustrated. In all three of these modified joint constructions, the spline and the groove in the stave edge wall have tapered or rounded surfaces to make the alignment of staves and insertion of spline easier. In FIGURE 7, spline 78 has an oval cross section. The charred inside surface 80 of the stave is preferably about one-half inch from the nearest side of spline 78, whose major and minor axes may be about one inch and one-quarter inch respectively. Side edges 82 and 84 of the staves may be spaced slightly to reduce the gross expansion of the planar side wall, and by choosing the spacing properly, the swelling of the staves when wet may serve to provide a tight joint along edge surfaces 82 and 84.

In FIGURE 8, spline 88 is diamond-shaped and may be cut with the grain oriented to give maximum strength to the joint. This form of spline may have a maximum thickness somewhat greater than one-quarter inch and the thickness tapered to a feathered edge to provide a large area for application of the adhesive. Preferably, the slot in the staves should also be correspondingly tapered, though extra clearance at the outer edges may be used as a reservoir for accommodating a greater amount of the adhesive.

In FIGURE 9, spline 86 is similar to spline 88 in FIGURE 8, except that the end edges are removed. Spline 86 may thus have considerable strength against bending, a large surface area over which the adhesive may be applied, and excellent aligning properties.

The use of joints between staves which have a large continuous layer of adhesive is important in reducing the loss of whiskey during the period of several years of storage required in the aging process. In the currently used round barrels with butt joints between body staves maintained under compression with metal hoops, dripping can be stopped by tightening hoops. However, statistically it is reported that loss during storage amounts in some distilleries in excess of 13%. It is believed that even though the barrel is sufficiently "tight" that dripping does not occur, a loss occurs due to the whiskey being present almost at the outer edge of the staves, and hence sufficiently close to the atmosphere to evaporate. By the use of the novel joint of the present invention, a barrier is provided between the liquid contents in the barrel-like container and the atmosphere whereby the loss of whiskey during the time required for aging should be materially reduced regardless of the configuration or shape of the barrel.

In FIGURE 10, there is illustrated a joint between two staves 90 and 92 which is similar to the joint shown in FIGURE 9, with the exception that instead of a spline 86 that in FIGURE 9 is a separate member, a finger 94 is formed as an integral part of stave 90. In stave 92, a groove is provided which may be similar to the grooves provided in the staves discussed in the embodiment shown in FIGURE 9, so that when the two staves 90 and 92 are pressed together, there will be self-alignment.

In the joint of FIGURE 10, the unused or charred surface is shown at 96. In the groove beyond the end of the fingerlike projection, a small reservoir may be provided for storing a body 98 of a bonding agent. Toward the outer surface 100 from finger 94, the surface of staves 92 may be tapered to provide a second reservoir for a body 104 of the bonding agent. To produce a joint whose outer surface does not have a large visible body of bonding agent, surface 102 may be tapered so that it abuts against the edge of stave 90.

When a square barrel-like container is filled with liquid, the forces acting on surface 96 tending to separate the joints, place tension forces on body 104 of the adhesive. Thus, the adhesive must have a high tensile strength. Because the expansion of the heads in the directions of the sides of the barrel is not the same due to the grain direction, it is also necessary that the adhesive bodies 98 and 104 have elastomeric properties, if the barrel is to be made leakproof.

In FIGURE 11, a double finger joint is illustrated wherein the inner charred surface is represented at 96 and the outer surface at 100. In this joint, each stave has a finger 106 and 108. The bonding agent is applied across the entire joint between the staves from surface 96 to surface 100, as was the case with the embodiment shown in FIGURE 10. It is also desirable to provide at least one reservoir for holding a body 110 of the bonding agent.

Referring now to FIGURES 12 and 13, there is there illustrated one corner of a square barrel-like container constructed in accordance with the principles of the present invention. In FIGURE 12, two flat body staves 120 and 122 are shown joined by a single radius stave 124. The joints at 126 and 128 may be similar to those illustrated and described in connection with FIGURE 10.

Head 130 is best shown in FIGURE 13. The croze cut in the upper end of the body staves is also illustrated in FIGURE 13 and contains an upper surface 132 and a lower surface 134. The lower surface 134 may be provided with a semi-circular groove 136. The peripheral edge of head 130 is provided with tapered surfaces that fit flush with surfaces 132 and 134. In the surface which fits flush with surface 134, a groove 138 may be provided which is similar to groove 136. Together, grooves 136 and 138 provide a reservoir for holding a body of bonding agent.

When the barrel is assembled, the bonding agent is applied along the total surface area of surfaces 132 and 134 and sufficient bonding agent is provided to fill the reservoir and hence provide a continuous ring of bonding agent which completely surrounds the periphery of the head 130. As is evident from the relationship of FIGURES 12 and 13, the bonding agent body 140 which surrounds the periphery of the head is in contact with the body of the bonding agent 98 at the joints between the staves. Since the bonding agent has sufficient elastomeric properties to avoid breaking as a result of the expansion due to swelling, there remains a seal around the entire periphery of the head which prevents leakage from the barrel at this critical location.

What is claimed and desired to be secured by Letters Patent is:

1. A barrel-like container comprising heads and side walls made from wooden staves that are quarter-sawn and have a thickness of between about ¾ and ⅝ of an inch, said side walls being comprised of a plurality of body staves having croze at opposite ends, said body staves having a straight longitudinal axis, said heads being made of staves having substantially planar surfaces and a peripheral edge fitting into said croze, and means for holding the body staves in longitudinal abutting relationship and for sealing the periphery of said heads into said croze comprising an elastomeric bonding agent applied to the mating surfaces of the head periphery and the wall surfaces of the croze.

2. The barrel-like container as defined in claim 1 wherein the mating surfaces of the head periphery and the wall surfaces of the croze are formed with a continuous groove that is located on the surface of the croze that contacts the inner surface of the head and extends around the entire periphery of the head and a body of said bonding agent is in said continuous groove.

3. A barrel-like container as defined in claim 1 wherein the side walls are comprised of body staves having the same width at their opposite ends as at their mid-sections and a width no greater than about 5 inches to thereby reduce a cupping effect when only one surface of the staves is wetted, and a layer of bonding agent located in the joints between adjacent body staves and extending into contact with the bonding agent surrounding the head periphery.

4. The barrel-like container as defined in claim 3 together with a plurality of hoop-like tension members surrounding the body staves and arranged to assist in holding the body staves together.

5. The barrel-like container as defined in claim 1 wherein the body staves are formed with substantially planar surfaces to provide a non-circular container with at least some of the body staves formed with surfaces having the shape of an arc of a cylinder having a straight axis parallel to the longest dimension of the stave for joining planar surfaces of said container together.

6. The barrel-like container as defined in claim 5 together with a plurality of hoop-like tension members surrounding the body staves and arranged to assist in holding said staves together.

7. The barrel-like container as defined in claim 1 wherein the heads comprise a plurality of adjacent head staves having the wood grain running in parallel directions, said head staves having substantially planar surfaces with the peripheral edge beveled to a reduced thickness, said beveled edge and the mating surface of said croze each having grooves located on the surface of the croze that contacts the inner surface of the heads for containing a body of said elastomeric bonding agent to thereby accommodate the differential displacement between head staves and body staves caused by swelling.

8. The barrel-like container as defined in claim 7 wherein the body staves are secured together by a layer of said elastomeric bonding agent which extends along the entire length of said staves and intersects the bonding agent at the peripheral edge of each of said heads to thereby reduce the leakage of said container.

9. A barrel-like container as defined in claim 1 wherein the body staves are formed with substantially planar surfaces to thus provide four planar side walls for said container and means joining said planar side walls comprising a corner stave having the shape of an arc of a cylinder.

10. A barrel-like container composed of body staves and head staves having a thickness of between ¾ and ⅝ of an inch, the body staves having straight longitudinal axes and being formed with substantially planar surfaces to provide a plurality of planar side walls, means joining said planar side walls comprising a corner stave having the shape of an arc of a cylinder, said body staves further having abutting edge surfaces with at least one of said edge surfaces at each joint having a longitudinally extending slot extending between opposite heads, and means for securing adjacent body staves together with sufficient strength to prevent separation of the staves when the container is filled with liquid and to provide a leak-proof joint including a body of elastomeric bonding agent located at the slot along the abutting edge surfaces of adjacent body staves.

11. A barrel-like container as defined in claim 10 wherein the slot between staves has a substantially uniform shape throughout its length, and the abutting edges of at least some of the adjacent staves between the slot and the stave surface on the inside of the container are spaced apart by a distance sufficient to reduce loading on the joint between adjacent staves caused by swelling of the staves due to wetting by a liquid in the container.

12. The barrel-like container as defined in claim 10 wherein the means for securing adjacent body staves together includes a finger extending from one stave into said slot in an adjacent stave which has a thickness of about one-quarter inch as measured in the direction of the thickness of said stave and a width which extends into the slot of about one-half inch.

13. The barrel-like container as defined in claim 12 wherein the finger has a generally rectangular cross section.

14. The barrel-like container as defined in claim 12 wherein the finger has its maximum thickness at the joint between the staves and tapers to a small thickness at the bottom of said slot.

15. The barrel-like container as defined in claim 14 wherein the finger has an oval cross section.

16. The barrel-like container as defined in claim 15 wherein the means for securing adjacent body staves together is diamond-shaped.

17. The barrel-like container as defined in claim 10 wherein the means for securing adjacent body staves together is a double finger point.

18. The barrel-like container as defined in claim 10 wherein the means for securing adjacent body staves together includes a finger-like projection on one body stave which extends into the slot of an adjacent body stave and the projection on adjacent staves serve to align the staves and void space is provided between staves which serves as a reservoir for said bonding agent body.

19. The barrel-like container as defined in claim 18 wherein the projection is spaced from the bottom of the slot to provide a first void space, a second void space is provided between the projection and the outside surface of the body staves, and the bonding agent is located in both void spaces.

20. A barrel-like container having a capacity in excess of about 40 gallons for aging whiskey comprising four or more substantialy straight side walls and heads at opposite ends, the side walls and heads being formed from wooden staves having a thickness from about ¾ to ⅝ of an inch, a longitudinal axis that is substantially straight and a char on the inside surface that is adapted to be in contact with whiskey; means joining the heads to opposite ends of the side wall staves including a croze in each of the opposite ends of said side wall staves and an elastomeric bonding agent that is applied at the croze to contact the periphery of the head and retard leakage; means joining adjacent staves together by a longitudinal joint including a continuous body of elastomeric bonding agent that is located in the interior of the joint between the charred surface and the outside surface and is in contact with bonding agent in each croze; and means joining the side walls together at each corner consisting of a wooden member.

21. A barrel-like container comprising heads and four planar side walls made from wooden staves that are quarter-sawn and have a thickness of between ¾ and ⅝ of an inch, said side walls being joined by corner members having the shape of an arc, said side walls being composed of body staves having abutting edge surfaces with at least one edge surface at each joint having a longitudinally continuous slot extending between opposite heads, a spline member extending from the edge surface of one body stave into the slot of an adjacent body stave, a body of an elastomeric bonding agent located along the slot and spline member only on the side of the spline member facing the outer surface of said container, and hoop-like tension members surrounding the top and bottom of the container.

References Cited

UNITED STATES PATENTS

| | | | |
|---|---|---|---|
| 59,622 | 11/1966 | Merrill | 217—96 |
| 483,478 | 9/1892 | Schmidt | 217—76 |
| 1,125,193 | 1/1915 | Sherratt | 217—4 |
| 1,440,948 | 1/1923 | Aiken. | |
| 2,115,615 | 4/1938 | Brunner. | |
| 2,315,742 | 4/1943 | Shipman | 217—80 X |
| 2,951,779 | 9/1960 | Mackey et al. | 217—17 X |
| 2,961,478 | 11/1960 | Burns. | |
| 3,082,489 | 3/1963 | Douglas. | |
| 3,240,379 | 3/1966 | Bremer et al. | 220—45 X |

FOREIGN PATENTS

| | | |
|---|---|---|
| 1,027,928 | 2/1953 | France. |
| 1,184,110 | 2/1959 | France. |
| 169,895 | 1/1935 | Switzerland. |

RAPHAEL H. SCHWARTZ, Primary Examiner